(12) United States Patent
Asada

(10) Patent No.: US 6,527,451 B2
(45) Date of Patent: Mar. 4, 2003

(54) OPTICAL CONNECTOR DEVICE FOR HOLDING OPTICAL FIBER CORD

(75) Inventor: Kazuhiro Asada, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/975,251

(22) Filed: Oct. 12, 2001

(65) Prior Publication Data

US 2002/0048434 A1 Apr. 25, 2002

(30) Foreign Application Priority Data

Oct. 20, 2000 (JP) ........................................ 2000-320889

(51) Int. Cl.[7] .............................. G02B 6/38; G02B 6/42
(52) U.S. Cl. .......................................... 385/58; 385/88
(58) Field of Search ..................................... 385/58, 88

(56) References Cited

U.S. PATENT DOCUMENTS

| | | | |
|---|---|---|---|
| 5,245,683 A | 9/1993 | Belenkiy et al. | 385/72 |
| 5,588,079 A | * 12/1996 | Tanabe et al. | 385/78 |
| 6,116,791 A | 9/2000 | Laninga et al. | 385/83 |
| 6,464,408 B1 | * 10/2002 | Nolan | 385/87 |

FOREIGN PATENT DOCUMENTS

JP    2001-235654    8/2001

* cited by examiner

Primary Examiner—Lynn Field
Assistant Examiner—Michael C. Zarroli
(74) Attorney, Agent, or Firm—Oliff & Berridge, PLC

(57) ABSTRACT

In an optical connector device, amounting opening portion 10 is formed in a bottom portion of a housing portion 2 of a first optical connector 1. A stopper 20 is inserted into the housing portion 2 through this mounting opening portion 10, and is engaged with a second covering portion of an optical fiber cord in the housing portion 2 to hold this optical fiber cord against withdrawal. A second optical connector 40 includes a tubular fitting portion 50 for fitting on the housing portion 2. This tubular fitting portion 50 is formed into such a shape as to cover at least part of the mounting opening portion 10 in a mutually-connected condition of the first and second optical connectors 1 and 40.

4 Claims, 10 Drawing Sheets

OPTICAL CONNECTOR DEVICE FOR HOLDING OPTICAL FIBER CORD

BACKGROUND OF THE INVENTION

1. Field of the Invention

This invention relates to an optical connector device for connecting an optical fiber cord to a light-receiving or a light-emitting element or for connecting optical fiber cords together in the field of optical communication between equipments in an OA, an FA, an automobile and so on.

2. Description of the Related Art

There is known an optical connector of this type (see Japanese Patent Application No. 2000-44351) includes a ferrule portion for holding an exposed portion of an optical fiber at an end portion of an optical fiber cord, and a connector housing for holding a covering portion (sheath) of the optical fiber cord at a rear side of the ferrule portion, the ferrule portion and the connector housing being formed integrally with each other.

In this optical connector, a stopper is inserted into the connector housing from one side thereof, and is engaged with the covering portion of the optical fiber cord in this connector housing, thereby retaining the optical fiber cord against withdrawal.

In this optical connector, however, the withdrawal of the stopper from the connector housing is prevented by the force of engagement between the stopper and the covering portion of the optical fiber cord, and therefore there is a possibility that the stopper is disengaged from the connector housing by vibrations, a change in the temperature environment and so on. This possibility is high particularly when the optical connector is mounted as an on-board connector within an engine room of an automobile or the like.

SUMMARY OF THE INVENTION

It is therefore an object of this invention to provide an optical connector device in which a stopper for holding an optical fiber cord against withdrawal is prevented from disengagement.

In order to achieve the above object, the present invention provides optical connector device comprising a first optical connector for holding an end portion of an optical fiber cord, and a second optical connector for holding other optical fiber cord or an optical element which is to be optically coupled to the optical fiber cord, wherein when the first and second optical connectors are connected together, the optical fiber cord and the other optical fiber cord or the optical element, held respectively by the two optical connectors, are optically coupled together; CHARACTERIZED in that:

the first optical connector comprises a housing portion of a generally tubular shape, and a stopper; and a cord receiving hole portion, in which the optical fiber cord can be inserted and received in an axial direction of the housing portion, is formed in the housing portion, and a mounting opening portion, through which the cord receiving hole portion communicates with the exterior, is formed in one side portion of the housing portion, and the stopper is inserted into the cord receiving hole portion through the mounting opening portion in a direction perpendicular to the direction of insertion of the optical fiber cord, and is engaged with a covering portion of the optical fiber cord in the cord receiving hole portion to hold the optical fiber cord in a manner to position the same in the axial direction thereof;

the second optical connector includes a holding portion for holding the other optical fiber cord or the optical element, and a tubular fitting portion which extends beyond a distal end of the holding portion, and can fit on the housing portion of the first optical connector; and the tubular fitting portion is formed into such a shape that in a mutually-connected condition of the first and second optical connectors, the whole or part of a peripheral wall of the tubular fitting portion extends to reach the mounting opening portion to cover at least part of the mounting opening portion.

Preferably, a pushing guide surface is formed at a distal end edge of that portion of the fitting tubular portion which can close the mounting opening portion, the pushing guide surface spreading outward gradually toward its distal end.

Preferably, a ferrule portion for holding that portion of an optical fiber, exposed at the end portion of the optical fiber cord, therein is formed integrally with the housing portion, and a ferrule introducing portion is formed integrally with the holding portion so as to guide the ferrule portion toward the other optical fiber cord or the optical element, held by the holding portion, when the first and second optical connectors are to be connected together.

DETAILED DESCRIPTION OF THE PREFERRED EMBODIMENTS

Figure 1:
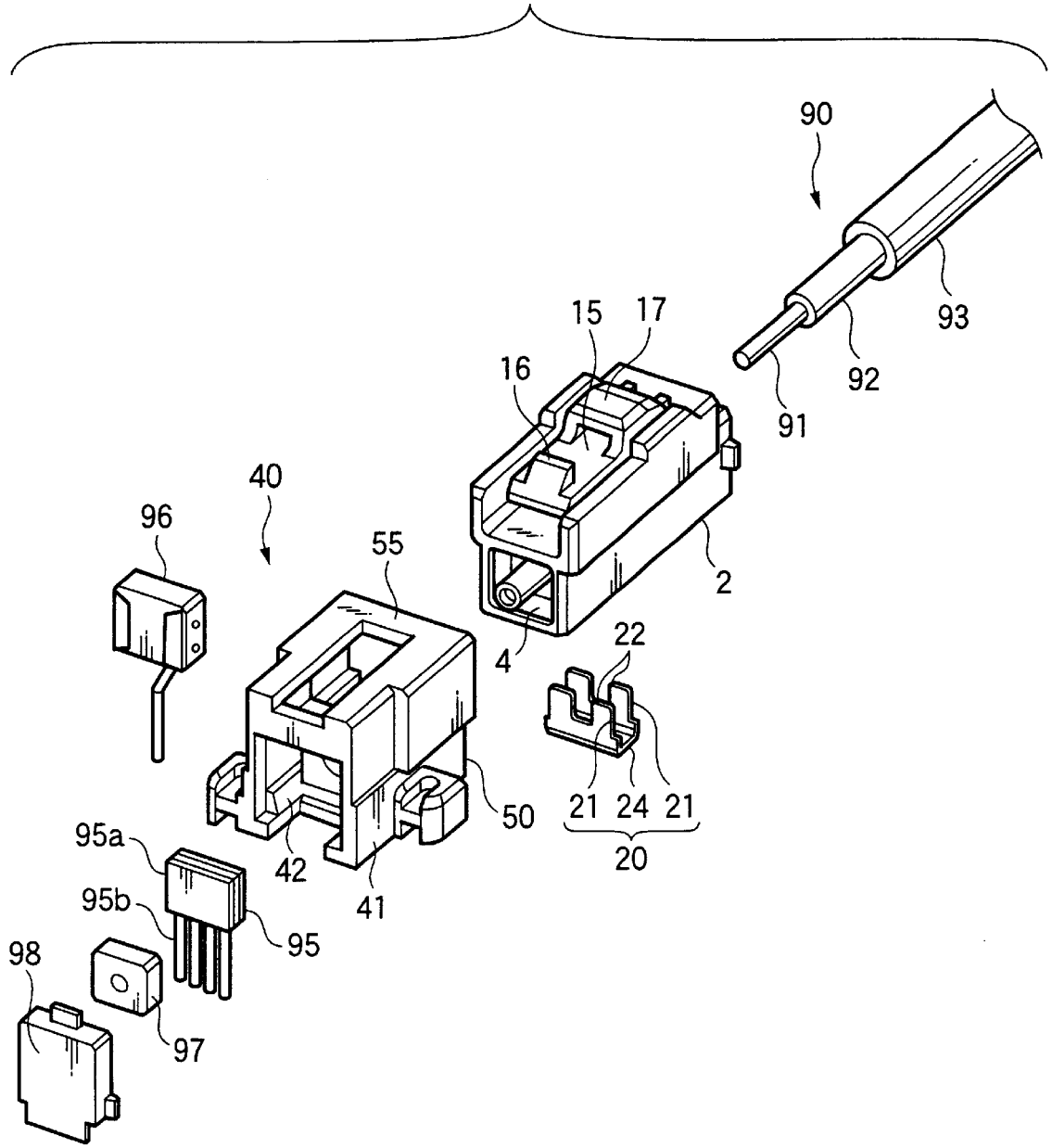
FIG. 1 is an exploded, perspective view of a preferred embodiment of an optical connector device of the present invention.

A preferred embodiment of an optical connector device of the present invention will now be described.

As shown in FIGS. 1 to 5, this optical connector device comprises a first optical connector 1 for holding an end portion of an optical fiber cord 90, and a second optical connector 40 for holding an optical element (device) 95 optically connectable to the optical fiber cord 90. When the first optical connector 1 and the second optical connector 40 are connected together, the optical fiber cord 90 is optically coupled to the optical element 95.

The optical fiber cord 90 comprises an optical fiber 91, comprising a core and a clad, a first covering portion 92 coated or formed on an outer peripheral surface of the optical fiber 91, and a second covering portion 93 coated on an outer peripheral surface of the first covering portion 92. When this optical fiber cord is to be held in the first optical connector 1, the second covering portion 93 is removed over a predetermined length at the end portion of the optical fiber cord 90 to expose the first covering portion 92, and further a distal end portion of the exposed first covering portion 92 is removed over a predetermined length to expose the optical fiber 91 (see FIGS. 1 and 2).

The first optical connector 1 includes a housing portion 2, and a stopper 20 inserted and received in this housing portion 2.

As shown in FIGS. 1 to 6, the housing portion 2 has a generally tubular shape, and a cord receiving hole portion 3, in which the optical fiber cord 90 can be inserted and received in an axial direction of the housing portion 2, is formed in the housing portion 2, and amounting opening portion 3, through which the cord receiving hole portion 3 communicates with the exterior, is formed in one side portion of the housing portion 2.

More specifically, the housing portion 2 is made of a resin or the like, and the cord receiving hole portion 3 is formed in the housing portion 2 of a generally tubular shape, and extends in the axial direction thereof. A ferrule portion 4 of a generally cylindrical tubular shape for holding the exposed optical fiber 91 at the end portion of the optical fiber cord 90 is formed integrally at a front end portion of the housing portion 2, and projects forwardly, and a ferrule receiving hole portion 4a is formed in this ferrule portion 4.

The cord receiving hole portion 3 includes an introducing hole portion 3a and a cord holding hole portion 3b which are arranged serially on a straight line in this order from a rear end of the housing portion 2, the hole portion 3a being smaller in inner diameter than the hole portion 3b. The ferrule receiving hole portion 4a is disposed forwardly of the cord holding hole portion 3b in coaxial relation thereto. The introducing hole portion 3a has such an inner diameter that the second covering portion 93 of the optical fiber cord 90 can be inserted therein, and the cord holding hole portion 3b has such an inner diameter that the first covering portion 92 of the optical fiber cord 90 can be inserted there in. The ferrule receiving hole portion 4a has such an inner diameter that the optical fiber 91 can be inserted therein.

When the end portion of the optical fiber cord 90 is inserted into the cord receiving hole portion 3 from the rear side thereof, the second covering portion 93 of the optical fiber cord 90 is received in the introducing hole portion 3a, and the first covering portion 92 of the optical fiber cord 90 is received in the cord holding hole portion 3b, and the optical fiber 91 is received in the ferrule receiving hole portion 4a. At this time, the optical fiber 91, when received in the ferrule receiving hole portion 4a, is held therein in a radially-positioned condition. Then, the end surface of the optical fiber 91 is processed into a specular surface at the distal end of the ferrule portion 4. Then, when the ferrule portion 4 is inserted into a ferrule introducing portion 43 of the second optical connector 40 (described later), the end surface of the optical fiber 91 is disposed in opposed relation to a light-emitting surface or a light-receiving surface of the optical element 95.

The mounting opening portion 10 is formed in that portion of a bottom portion (one side portion) of the housing portion 2 corresponding to the cord holding hole portion 3b.

The mounting opening portion 10 is in the form of a generally square opening, and a pair of right and left retaining grooves 3c (see FIG. 6) are formed respectively in front portions of opposed inner side surfaces of that portion of the cord holding hole portion 3b corresponding to the mounting opening portion 10, whereas another pair of right and left retaining grooves 3c are formed respectively in rear portions of these opposed inner side surfaces, these retaining grooves 3c serving as retaining portions for retaining the stopper 20. Opposite side edges of one of a pair of retaining plate portions 21 of the stopper 20 (described later) are slidingly fitted respectively in the pair of front retaining grooves 3c to be retained therein, whereas opposite side edges of the other retaining plate portion 21 are slidingly fitted respectively in the pair of rear retaining grooves 3c to be retained therein. By doing so, the pair of retaining plate portions 21 are held in a posture perpendicular to the direction of insertion of the optical fiber cord 90.

As shown in FIGS. 1 to 5, the stopper 20 is inserted into the cord receiving hole portion 3 through the mounting opening portion 10 in a direction perpendicular to the direction of insertion of the optical fiber cord 90, and is engaged with the first covering portion 92 of the optical fiber cord 90 in the cord receiving hole portion 3 to hold the optical fiber cord 90 in a manner to position the same in the axial direction thereof.

More specifically, the stopper is formed, for example, by pressing a thin sheet member of metal or other material, and this stopper includes the pair of generally-square retaining plate portions 21 of a predetermined thickness interconnected by an interconnecting piece portion 24 in parallel relation to each other, so that this stopper has a generally U-shape when viewed from the side thereof.

Each of the retaining plate portions 21 is in the form of a generally square plate, and a positioning slit 22 (see FIG. 1) of a generally U-shaped contour is formed in a widthwise-central portion of the retaining plate portion 21, and is open to a distal end of this retaining plate portion 21.

Each of the retaining plate portions 21 is inserted into the cord holding hole portion 3b through the mounting opening portion 10, with the opposite side edges thereof slidingly fitted respectively in the associated retaining grooves 3c formed in the cord holding hole portion 3b. By doing so, each retaining plate portion 21 is held in the cord holding hole portion 3b in a posture perpendicular to the direction of insertion of the optical fiber cord 90.

When the retaining plate portions 21 are thus inserted in the cord holding hole portion 3b, the interconnecting piece portion 24 is abutted against lower surfaces of the side walls of the cord holding hole portion 3b, each formed between the front and rear retaining grooves 3c, thereby limiting the movement of the stopper 20 in the inserting direction. At this time, the interconnecting piece portion 24 is disposed generally flush with the bottom surface of the housing portion 2 to close the mounting opening portion 10.

Figure 7:
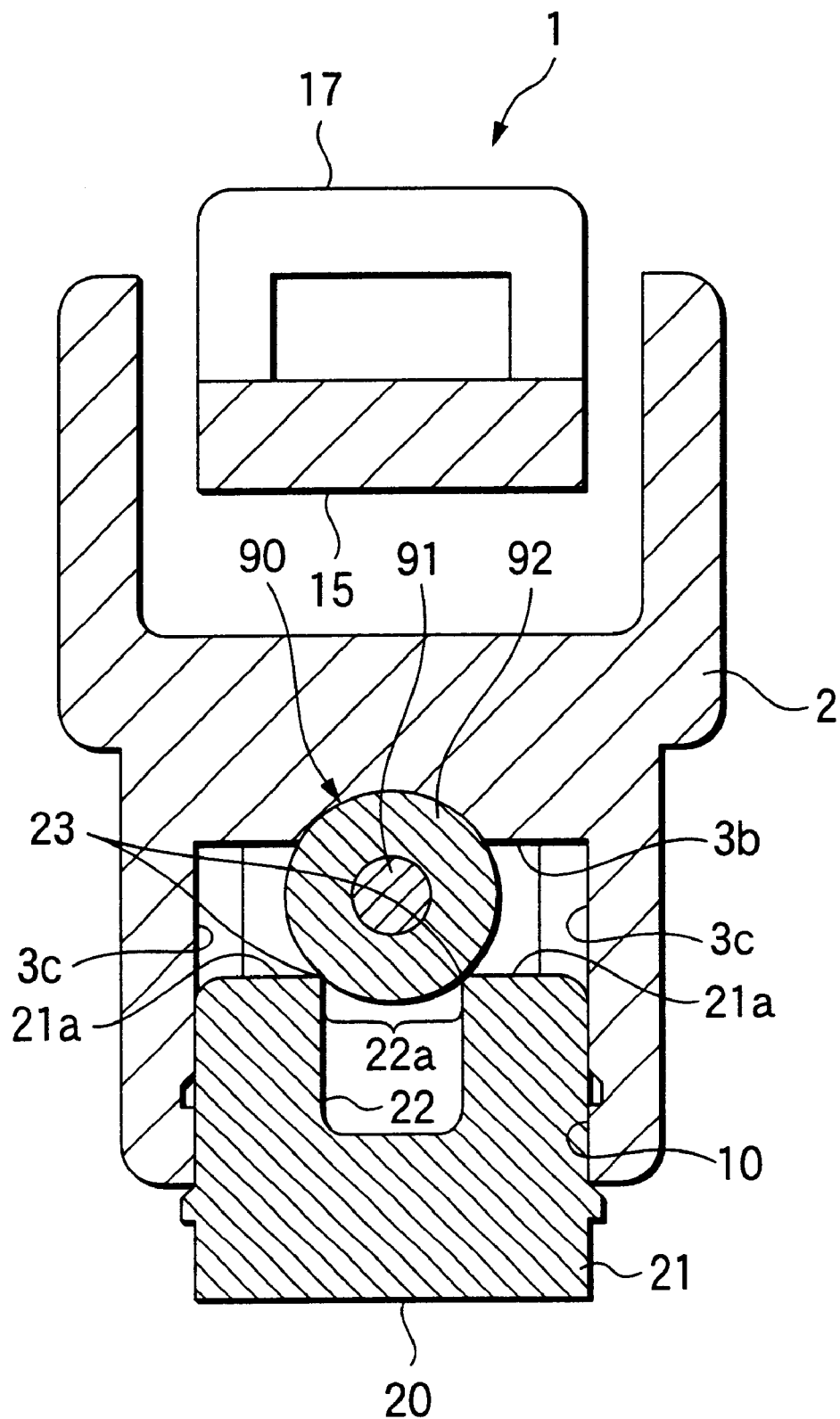
FIG. 7 is a cross-sectional view showing a process of holding an optical fiber cord in the first optical connector.

Each of the positioning slits 22 has a width which is slightly smaller than the diameter of the optical fiber cord 90 (which is to be positioned), and is larger than the diameter of the optical fiber 91. In this embodiment, that portion of the optical fiber cord 90, at which the first covering portion 92 is exposed by removing the second covering portion 93, is to be held in a positioned condition by the stopper 20. Therefore, the width of each positioning slit 22 is smaller than the diameter of the exposed first covering portion 92, and is larger than the diameter of the optical fiber 91, as shown in FIG. 7.

Figure 8:
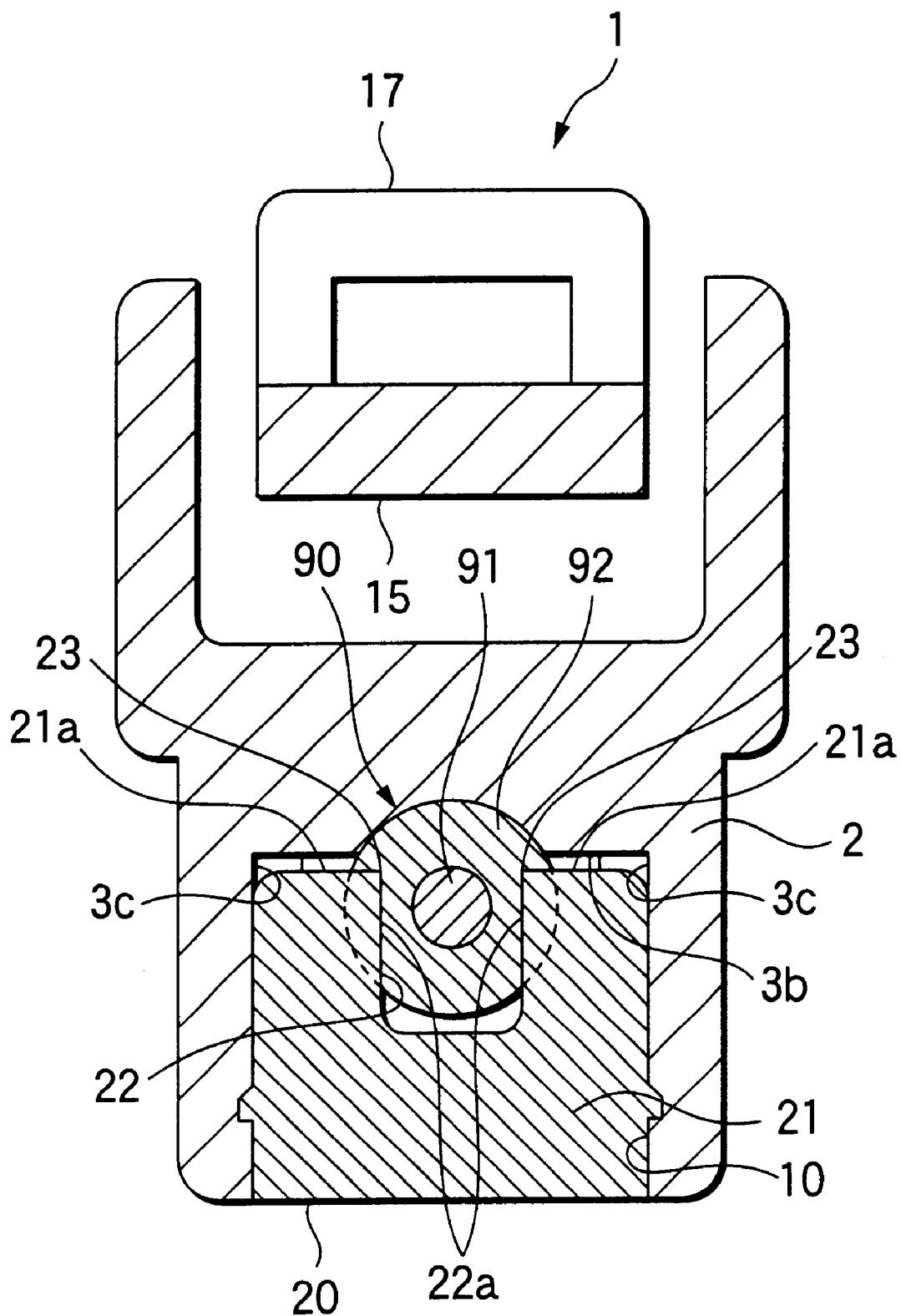
FIG. 8 is a cross-sectional view showing a condition in which the optical fiber cord is held in the first optical connector.

Blades portions 23 are formed respectively at open (distal) ends of opposed side edges 22a of the positioning slit 22, and each blade portion 23 is formed at a corner portion into which the side edge 22a of the positioning slit 22 and a distal end edge 21a of the retaining plate portion 21 merge. Each blade portion 23 is defined by the surface of the side edge 22a of the positioning slit 22 (which is parallel to the direction of insertion of the retaining plate portion 21) and the surface of the distal end edge 21a of the retaining plate portion 21 which perpendicularly intersect each other. The stopper 20 is inserted halfway into the cord holding hole portion 3b through the mounting opening portion 10, thereby bringing each blade portion 23 into abutting engagement with the first covering portion 92 of the optical fiber cord 90, as shown in FIG. 7. In this condition, when the stopper 20 is further inserted, each blade portion 23 cuts the first covering portion 92 as in a planer, so that the opposed side edges 22a of each positioning slit 22 are engaged in these cut portions, respectively, as shown in FIG. 8.

An engagement extension piece portion 15 is provided at an upper portion of the housing portion 2 of the first optical connector 1 of this embodiment, and extends in a cantilever manner from a rear portion thereof toward the front end thereof, and an engagement projection 16, engageable with an engagement piece portion 55 of the second optical connector 40, is formed at a distal end of the engagement extension piece portion 15. For connecting the first optical connector 1 and the second optical connector 40 together, a slanting surface 16a of the engagement projection 16 is pressed against the engagement piece portion 55, and therefore the engagement extension piece portion 15 is elastically deformed downwardly to move the engagement projection 16 downward, and the engagement projection 16 is slid past the engagement piece portion 55, and is brought into retaining engagement with this engagement piece portion 55, thereby holding the two optical connectors 1 and 40 in a mutually-connected condition. An operating portion 17 is formed on an upper surface of the engagement extension piece portion 15, and for canceling the connected condition of the two optical connectors 1 and 40, the operating portion 17 is pressed down to cancel the engagement of the engagement projection 16 of the first optical connector 1 with the engagement piece portion 55 of the second optical connector 40.

The procedure of holding the optical fiber cord 90 in the first optical connector 1 of this construction will be described.

Figure 2:
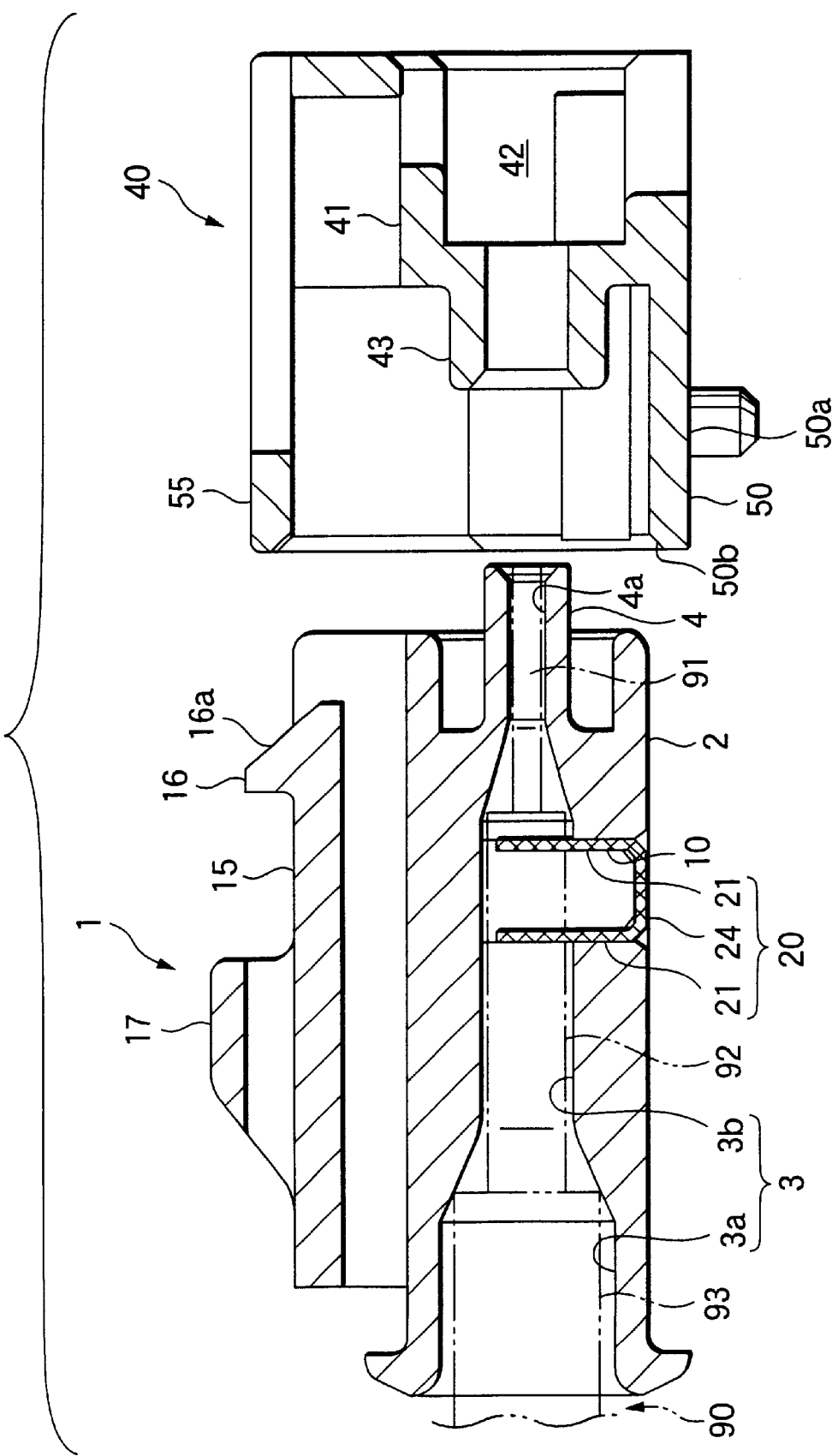
FIG. 2 is a cross-sectional view showing a condition in which a first optical connector and a second optical connector of the optical connector device are disconnected from each other.

First, the end portion of the optical fiber cord 90, from which the first covering portion 92 and the second covering portion 93 have been removed, is inserted into the receiving hole portion 3 in the housing portion 2 from the rear side thereof, and the exposed portion of the optical fiber 91, the exposed portion of the first covering portion 92 and the end portion of the second covering portion 93 are received in the ferrule receiving hole portion 4a, the cord holding hole portion 3b, and the introducing hole portion 3a, respectively (see FIG. 2). Then, in this condition, the stopper 20 is pushed into the cord holding hole portion 3b through the mounting opening portion 10. As a result, each of the blade portions 23 abuts against a lower portion of the outer peripheral surface of the first covering portion 92 of the optical fiber cord 90 disposed in offset relation to a vertical plane in which the axis of the optical fiber cord 90 lies, as shown in FIG. 7. When the stopper 20 is further pushed, each blade portion 23 cuts the first covering portion 92 of the optical fiber cord 90 as in a planer, so that the opposed side edges 22a of each positioning slit 22 are engaged in these cut portions, respectively, as shown in FIG. 8, and therefore the optical fiber cord 90 is held in a positioned condition in its axial direction. When the optical fiber cord 90 is thus held, that portion of the covering portion 92, into which the blade portions 23 penetrate, does not allow the optical fiber 91 to be easily compressed radially when and after fixing the optical fiber cord 90 in a positioned condition, and this achieves an advantage that a strain is less liable to develop in the optical fiber 91, so that its light loss can be kept to a low level.

In the first optical connector 1, the ferrule portion 4 is formed integrally with the housing portion 2, and therefore the production of this first optical connector is easy, and besides there is an advantage that this connector can not be easily disassembled.

As shown in FIGS. 1 to 5, the second optical connector 40 includes a holding portion 41 for holding the optical element 95, and a tubular fitting portion 50 which extends beyond a distal end of the holding portion 41, and can fit on the housing portion 2 of the first optical connector 1.

More specifically, the holding portion 41 is made of a resin or the like, and has a box-like shape, and an element receiving portion 42 for receiving the optical element 95 is formed in this holding portion 41. The rear side and lower side of the element receiving portion 42 are open. The optical element 95 is received in a predetermined electrically-conductive casing 96, and in this condition a body portion 95a of this optical element is pushed toward the front side of the element receiving portion 42, and is received in this element receiving portion 42 in such a manner that leads 95b, extending downwardly from the optical element 95, are extended downwardly through the lower portion of the element receiving portion 42. Thereafter, a spacer 97 is mounted in the element receiving portion 42 from the rear side thereof, and a mounting member 98 is fixedly mounted on the holding portion 41, and by doing so, the optical element 95 can be received and held in a predetermined posture in the element receiving portion 42.

The ferrule introducing portion 43 of a tubular shape, into which the ferrule portion 4 of the first optical connector 1 can be inserted, is formed integrally at a distal end of the holding portion 41, and is disposed forwardly of the light-emitting or the light-receiving surface of the optical element 95 received in the element receiving portion 42. When the ferrule portion 4 of the first optical connector 1 is inserted into the ferrule introducing portion 43, the end surface of the optical fiber 91, received in the ferrule portion 4, is disposed in opposed relation to the light-emitting or the light-receiving surface of the optical element 95, so that the optical fiber 91 and the optical element 95 are optically coupled together.

The tubular fitting portion 50 of a generally square tubular shape is formed integrally at the front end portion of the holding portion 41, and projects beyond the front end of this holding portion in surrounding relation to the ferrule introducing portion 43. In this embodiment, the tubular fitting portion 50 is so shaped as to fit on the housing portion 2 including the engagement extension piece portion 15.

The tubular fitting portion 50 is formed into such a shape that when the first and second optical connectors 1 and 40 are connected together, the whole of a peripheral wall of this tubular fitting portion 50 extends to reach the mounting opening portion 10 to cover at least part of this mounting opening portion 10. In this embodiment, the tubular fitting portion 50 covers a front half of the mounting opening portion 10 when the first and second optical connectors 1 and 40 are connected together. Therefore, when the first and second optical connectors 1 and 40 are connected together, the tubular fitting portion 50 partially closes the mounting opening portion 10, thereby preventing the stopper 20 from being withdrawn from the mounting opening portion 10.

A pushing guide surface 50b is formed at a distal end edge of a bottom portion 50a of the fitting tubular portion 50 which can close the mounting opening portion 10, and this pushing guide surface 50b spreads outward gradually toward its distal end. If the stopper 20 is projected a predetermined small amount from the mounting opening portion 10 when the first and second optical connectors 1 and 40 are to be connected together, the pushing guide surface 50b is brought into sliding contact with this projected portion of the stopper 20, and pushes or forces the stopper 20 into the mounting opening portion 10, as described later.

In this embodiment, the engagement piece portion 55 for engagement with the engagement projection 16 of the first optical connector 1 is formed at the upper portion of the tubular fitting portion 50 at the front end thereof, and when the engagement projection 16 is engaged with the engagement piece portion 55, the first and second optical connectors 1 and 40 are held in the connected condition against withdrawal from each other.

In the second optical connector 40, the holding portion 41 and the ferrule introducing portion 43 are formed integrally with each other, and therefore there is achieved an advantage that the production of this second optical connector is easy.

Figure 3:
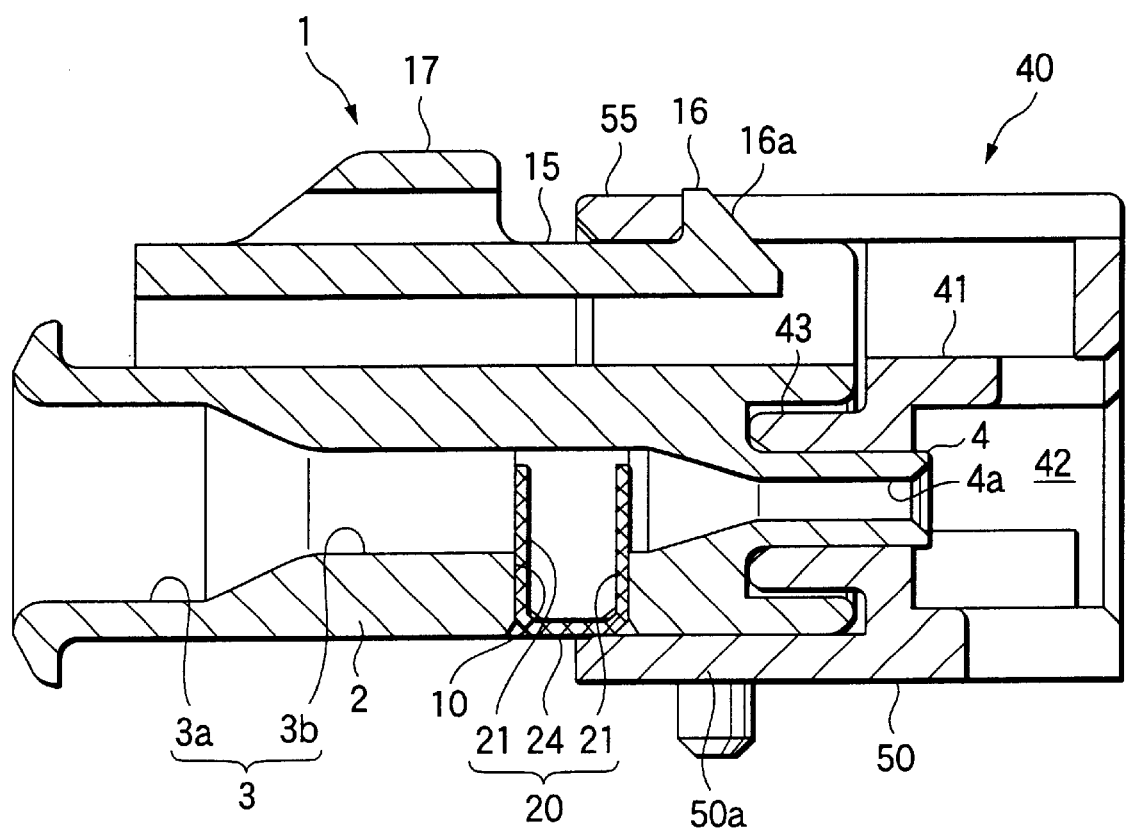
FIG. 3 is a cross-sectional view showing the first and second optical connectors in their mutually-connected condition.
Figure 4:
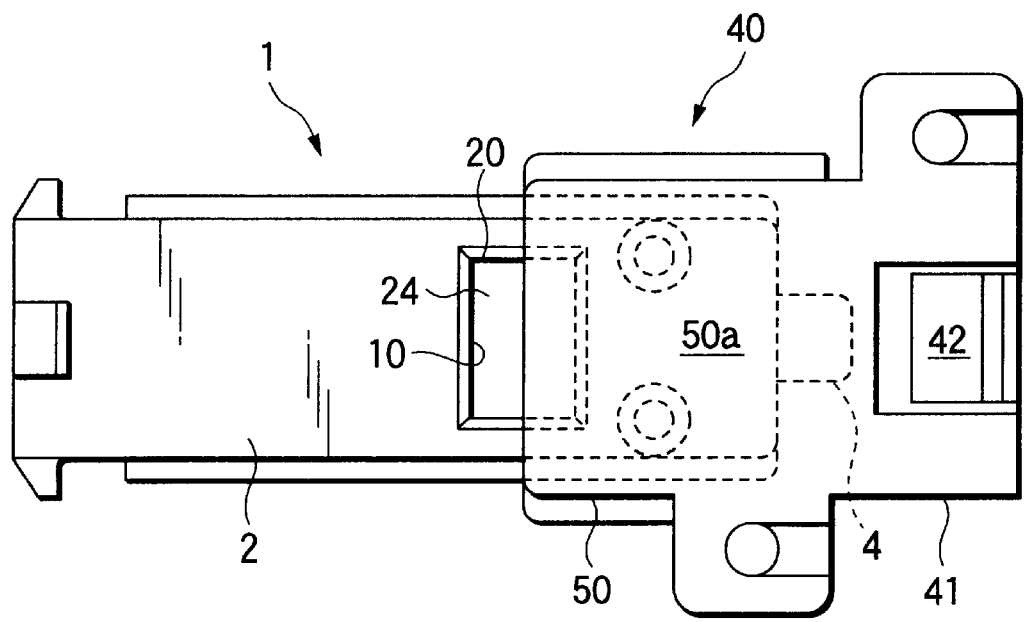
FIG. 4 is a bottom view showing the first and second optical connectors in their mutually-connected condition.
Figure 5:
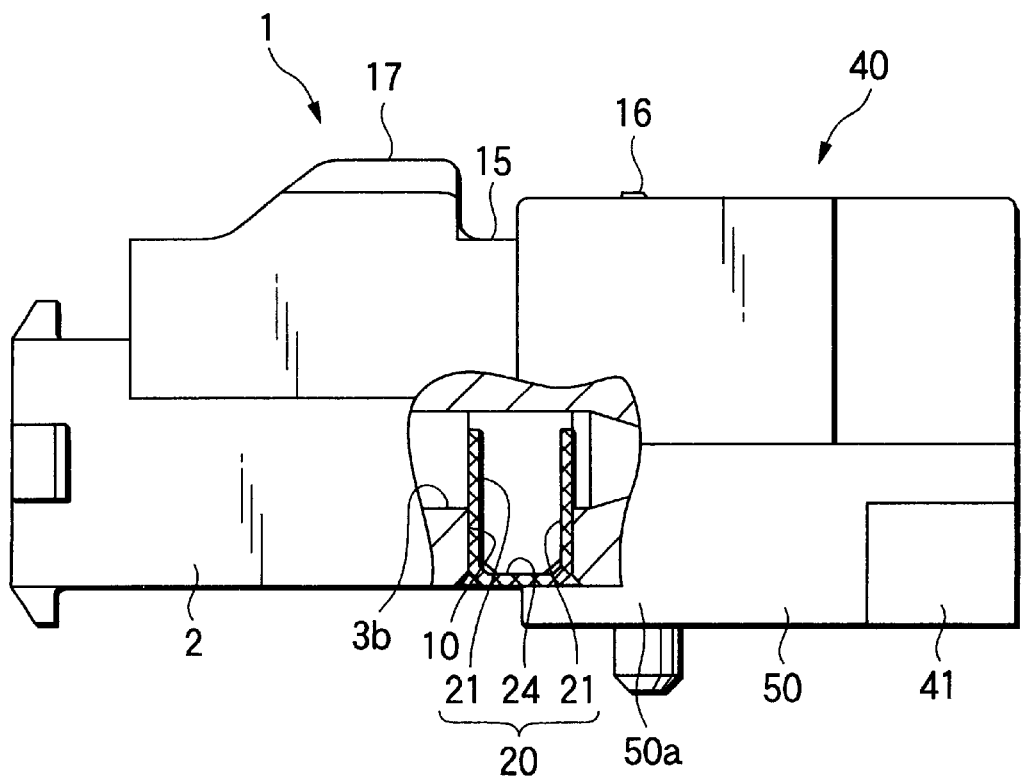
FIG. 5 is a partly-broken, cross-sectional view showing the first and second optical connectors in their mutually-connected condition.
Figure 6:
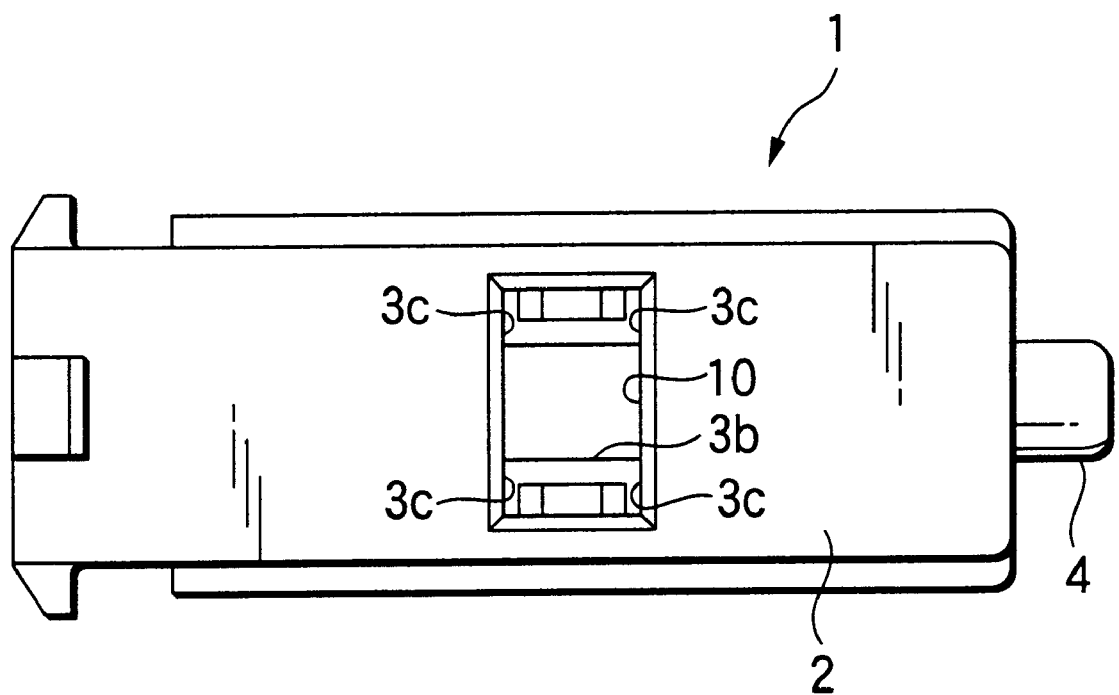
FIG. 6 is a bottom view of the first optical connector.

In the optical connector device of the above construction, when the first and second optical connectors 1 and 40 are pushed relative to each other until the engagement projection 16 becomes engaged with the engagement piece portion 55, so that the two connectors are connected together, the ferrule portion 4 is inserted into the ferrule introducing portion 43, and the optical fiber cord 90 and the optical element 95 are optically coupled together, and at the same time the tubular fitting portion 50 is fitted on the housing portion 2. In this condition, the bottom portion 50a of the tubular fitting portion 50 closes about the front half of the mounting opening portion 10 as shown in FIGS. 3 to 5. Therefore, even when in the connected condition of the first and second optical connectors 1 and 40, the stopper 20 tends to move out of the housing portion 2 through the mounting opening portion 10 because of vibrations, a change in the temperature environment and so on, the bottom portion 50a of the tubular fitting portion 50 prevents the disengagement of the stopper 20. This is effective particularly in an environment in which an automobile undergoes severe vibrations, an environment in which a temperature change is severe, and an environment in which the stopper 20 can be easily loosened to be disengaged.

Figure 9:
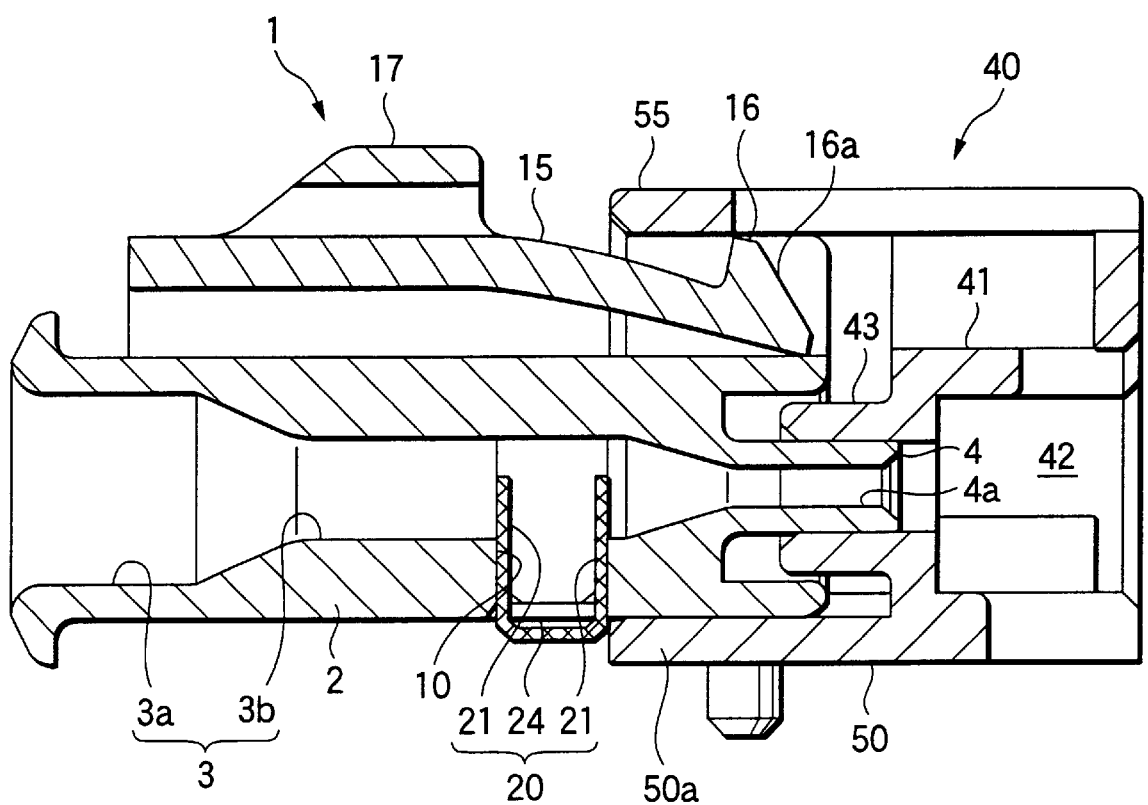
FIG. 9 is a cross-sectional view showing a process of connecting the first and second optical connectors together.

If the stopper 20 is insufficiently inserted, and therefore is projected outwardly more than the predetermined amount from the mounting opening portion 10 when the first and second optical connectors 1 and 40 are to be connected together, the distal end edge of the bottom portion 50a of the tubular fitting portion 50 is brought into engagement with this projected portion of the stopper 20 before the engagement projection 16 is engaged with the engagement piece portion 55, that is, before the connection between the first and second optical connectors 1 and 40 is completed, as shown in FIG. 9, and as a result the first and second optical connectors 1 and 40 are prevented from being further pushed relative to each other, and therefore are prevented from being completely connected together. Therefore, the insufficiently-inserted condition of the stopper 20 can be easily noticed when connecting the first and second optical connectors 1 and 40 together.

At this time, if the amount of projecting of the stopper 20 from the mounting opening portion 10 is so small that the projected portion of the stopper 20 can be brought into sliding contact with the pushing guide surface 50b of the tubular fitting portion 50, the stopper 20 is fully pushed into the mounting opening portion 10 by the sliding contact between the projected portion of the stopper 20 and the pushing guide surface 50b when the first and second optical connectors 1 and 40 are connected together. Therefore, when the amount of projecting of the stopper 20 is small, and is not more than the predetermined amount, the stopper 20 can be fully inserted by the connecting operation for connecting the first and second optical connectors 1 and 40 together, and this is convenient.

In this embodiment, although the optical element 95, such as a light-emitting element and a light-receiving element, is held in the second optical connector 40, the second optical connector 40 may hold other optical fiber cord, in which case the optical fiber cord 90 is optically coupled to the other optical fiber cord when the first and second optical connectors 1 and 40 are connected together.

In this embodiment, the tubular fitting portion 50 is formed into such a shape that in the mutually-connected condition of the first and second optical connectors 1 and 40, the whole of the peripheral wall of this tubular fitting portion 50 extends to reach the mounting opening portion 10 to cover about the front half of this mounting opening portion 10. However, the tubular fitting portion 50 can be so shaped as to cover at least part of the mounting opening portion 10 to prevent the disengagement of the stopper 20. The tubular fitting portion 50 can be so shaped as to fully cover the mounting opening portion 10.

Figure 10:
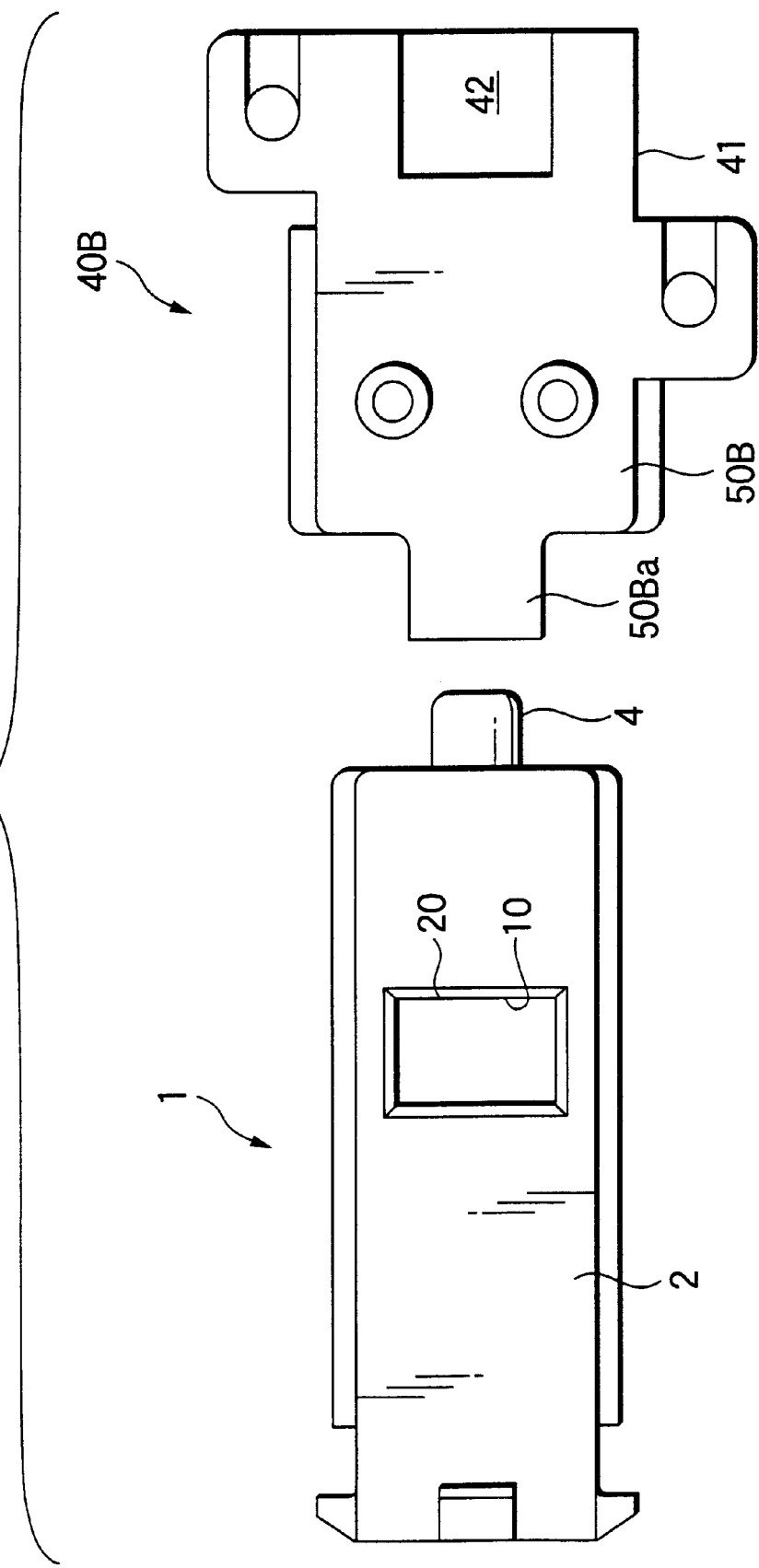
FIG. 10 is a bottom view showing a condition in which a first optical connector and a second optical connector of a modified connector device are disconnected from each other.
Figure 11:
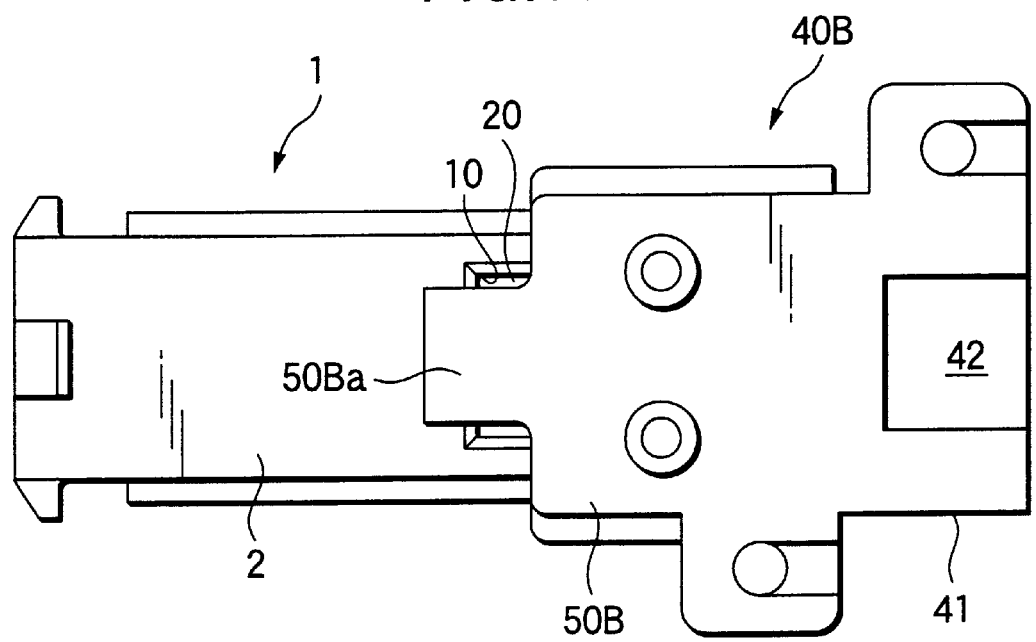
FIG. 11 is a bottom view showing the first and second optical connectors in their mutually-connected condition.
Figure 12:
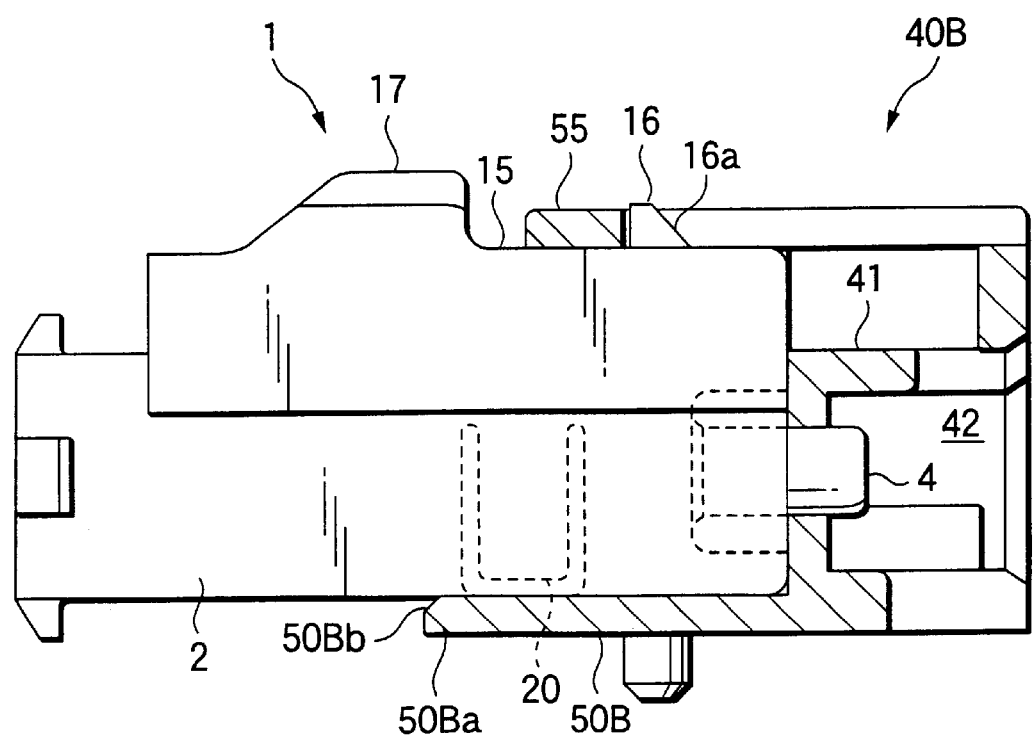
FIG. 12 is a partly cross-sectional, side-elevational view showing the first and second optical connectors in their mutually-connected condition.

FIGS. 10 to 12 show a modified form of the invention. A tubular fitting portion 50B (corresponding to the fitting tubular portion 50) of a second optical connector 40B (corresponding to the second optical connector 40) is so shaped that when the first optical connector 1 and the second optical connector 40B are connected together, at least part (only a bottom portion 50Ba in this modified example) of a peripheral wall of the tubular fitting portion 50B extends to reach the mounting opening portion 10 to cover at least part of this mounting opening portion 10 (cover the mounting opening portion 10 over its entire dimension between its front and rear edges). In the modified example shown in FIGS. 10 to 12, those constituent elements, similar to those of the connector device of the above embodiment, are designated by identical reference numerals, respectively, and explanation thereof is omitted here.

In this modified example, a pushing guide surface 50Bb can be formed at a distal end edge of the extended bottom portion 50Ba, this pushing guide surface spreading outward gradually toward its distal end. In this case, when the first and second optical connectors 1 and 40B are to be connected together, the pushing guide surface 50Bb is brought into sliding contact with the stopper 20, projecting a small amount (less than the predetermined value) from the mounting opening portion 10, thereby completely inserting the stopper 20.

As described above, in the optical connector device of the present invention, the first optical connector comprises the housing portion of a generally tubular shape, and the stopper, and the cord receiving hole portion, in which the optical fiber cord can be inserted and received in the axial direction of the housing portion, is formed in the housing portion, and the mounting opening portion, through which the cord receiving hole portion communicates with the exterior, is formed in one side portion of the housing portion, and the stopper is inserted into the cord receiving hole portion through the mounting opening portion in the direction perpendicular to the direction of insertion of the optical fiber cord, and is engaged with the covering portion of the optical fiber cord in the cord receiving hole portion to hold the optical fiber cord in a manner to position the same in the axial direction thereof, and the second optical connector includes the holding portion for holding the other optical fiber cord or the optical element, and the tubular fitting portion which extends beyond the distal end of the holding portion, and can fit on the housing portion of the first optical connector, and the tubular fitting portion is formed into such a shape that in the mutually-connected condition of the first and second optical connectors, the whole or part of the peripheral wall of the tubular fitting portion extends to reach the mounting opening portion to cover at least part of the mounting opening portion. Therefore, when the first and second optical connectors are connected together, at least part of the mounting opening portion is closed by the tubular fitting portion, and therefore the stopper is prevented from disengagement from the mounting opening portion.

And besides, if the stopper is projected outwardly more than the predetermined amount from the mounting opening portion when the first and second optical connectors are to be connected together, the distal end edge of the tubular fitting portion abuts against the projected portion of the stopper before the two connectors are completely connected together, thereby preventing the operation for connecting the first and second optical connectors together, and therefore the incompletely-inserted condition of the stopper can be easily noticed.

The pushing guide surface is formed at the distal end edge of that portion of the fitting tubular portion which can close the mounting opening portion, the pushing guide surface spreading outward gradually toward its distal end. In this construction, when the amount of projecting of the stopper is small, and is not more than the predetermined amount, the stopper is pushed fully into the mounting opening portion by the sliding contact between the projected portion of the stopper and the pushing guide surface. Therefore, the complete insertion of the stopper can be effected by the operation for connecting the first and second optical connectors together, and this is convenient.

The ferrule portion for holding that portion of the optical fiber, exposed at the end portion of the optical fiber cord, therein is formed integrally with the housing portion, and the ferrule introducing portion is formed integrally with the holding portion so as to guide the ferrule portion toward the other optical fiber cord or the optical element, held by the holding portion, when the first and second optical connectors are to be connected together. In this construction, the number of the component parts of the first optical connector, as well as the number of the component parts of the second optical connector, is reduced, and therefore there is achieved an advantage that these connectors can be produced easily.

What is claimed is:

1. An optical connector device comprising:
   a first optical connector for holding an end portion of an optical fiber cord; and
   a second optical connector for holding other optical fiber cord or an optical element which is to be optically coupled to said optical fiber cord; wherein
   when said first and second optical connectors are connected together, said optical fiber cord and the other optical fiber cord or said optical element, held respectively by said two optical connectors, are optically coupled together; said first optical connector comprises:
   a housing portion of a generally tubular shape,
   a stopper;
   a cord receiving hole portion, in which said optical fiber cord can be inserted and received in an axial direction of said housing portion, and is formed in said housing portion, and
   a mounting opening portion, through which said cord receiving hole portion communicates with the exterior, is formed in one side portion of said housing portion, and
   said stopper is inserted into said cord receiving hole portion through said mounting opening portion in a direction perpendicular to the direction of insertion of said optical fiber cord, and is engaged with a covering portion of said optical fiber cord in said cord receiving hole portion to hold said optical fiber cord in a manner to position the same in the axial direction thereof; said second optical connector includes:
   a holding portion for holding said other optical fiber cord or said optical element, and
   a tubular fitting portion which extends beyond a distal end of said holding portion, and can fit on said housing portion of said first optical connector; and
   said tubular fitting portion is formed into such a shape that in a mutually-connected condition of said first and second optical connectors, the whole or part of a peripheral wall of said tubular fitting portion extends to reach said mounting opening portion to cover at least part of said mounting opening portion.

2. An optical connector device according to claim 1, wherein a pushing guide surface is formed at a distal end edge of that portion of said fitting tubular portion which can close said mounting opening portion, said pushing guide surface spreading outward gradually toward its distal end.

3. An optical connector device according to claim 1, wherein a ferrule portion for holding that portion of an optical fiber, exposed at the end portion of said optical fiber cord, therein is formed integrally with said housing portion, and a ferrule introducing portion is formed integrally with said holding portion so as to guide said ferrule portion toward said other optical fiber cord or said optical element, held by said holding portion, when said first and second optical connectors are to be connected together.

4. An optical connector device according to claim 2, wherein a ferrule portion for holding that portion of an optical fiber, exposed at the end portion of said optical fiber cord, therein is formed integrally with said housing portion, and a ferrule introducing portion is formed integrally with said holding portion so as to guide said ferrule portion toward said other optical fiber cord or said optical element, held by said holding portion, when said first and second optical connectors are to be connected together.

* * * * *